United States Patent
Heydt et al.

(10) Patent No.: US 6,710,567 B2
(45) Date of Patent: Mar. 23, 2004

(54) VELOCITY DEPENDENT REFERENCE PROFILE FOR SPINDLE MOTOR ACCELERATION CONTROL

(75) Inventors: Jeffrey A. Heydt, Oklahoma City, OK (US); Christopher L. Hill, Apple Valley, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 15 days.

(21) Appl. No.: 10/028,222

(22) Filed: Dec. 21, 2001

(65) Prior Publication Data

US 2002/0135333 A1 Sep. 26, 2002

Related U.S. Application Data

(63) Continuation-in-part of application No. 09/995,206, filed on Nov. 27, 2001.
(60) Provisional application No. 60/253,216, filed on Nov. 27, 2000, and provisional application No. 60/286,628, filed on Apr. 26, 2001.

(51) Int. Cl.[7] .................. G05B 11/01; G05B 19/10; G05B 11/28
(52) U.S. Cl. .................. 318/560; 318/567; 318/599; 318/162
(58) Field of Search .................. 318/560, 599–605, 318/162, 696, 685; 388/904, 804, 801, 819, 829, 831, 847, 833, 806, 815, 854, 901, 928

(56) References Cited

U.S. PATENT DOCUMENTS

| | | |
|---|---|---|
| 4,130,769 A | 12/1978 | Karube |
| 4,169,990 A | 10/1979 | Lerdman |
| 4,405,885 A | 9/1983 | Okamoto |
| 4,531,079 A | 7/1985 | Müller |
| 4,631,459 A | 12/1986 | Fujioka et al. |
| 4,633,150 A | 12/1986 | Inaji et al. |
| 4,712,050 A | 12/1987 | Nagasawa et al. |
| 4,748,386 A | 5/1988 | Nakanishi et al. |
| 4,888,533 A | 12/1989 | Gotoh et al. |
| 4,896,807 A | 1/1990 | Mundschau |
| 4,992,710 A | 2/1991 | Cassat |
| 5,001,405 A | 3/1991 | Cassat |
| 5,028,852 A | 7/1991 | Dunfield |
| 5,117,165 A | 5/1992 | Cassat et al. |
| 5,159,246 A | 10/1992 | Ueki |
| 5,166,583 A | 11/1992 | Min et al. |
| 5,184,038 A | 2/1993 | Matsui et al. |
| 5,189,574 A | 2/1993 | Imamura et al. |
| 5,254,914 A | 10/1993 | Dunfield et al. |
| 5,274,310 A | 12/1993 | Bahn |
| 5,285,135 A | 2/1994 | Carobolante et al. |
| 5,289,097 A | 2/1994 | Erickson et al. |
| 5,298,839 A | 3/1994 | Takeda |
| 5,334,917 A | 8/1994 | Lind |

(List continued on next page.)

Primary Examiner—Robert Nappi
Assistant Examiner—Patrick L Miller
(74) Attorney, Agent, or Firm—Fellers, Snider, et al.

(57) ABSTRACT

Method and apparatus for accelerating a disc drive spindle motor to an operational velocity at which data are transferred between a host device and a disc rotated by the spindle motor. The spindle motor is initially accelerated from rest to an intermediate velocity at which sufficient back electromotive force (bemf) is generated by the rotation of the spindle motor to enable commutation circuitry of the disc drive to time the application of drive pulses to the spindle motor. The spindle motor is subsequently accelerated from the intermediate velocity to the operational velocity by applying a velocity dependent reference profile which establishes a sequence of reference levels to control the flow of current through the spindle motor during acceleration. The sequence of reference levels have different magnitudes at different velocities of the spindle motor between the intermediate velocity and the operational velocity.

31 Claims, 8 Drawing Sheets

U.S. PATENT DOCUMENTS

| | | |
|---|---|---|
| 5,343,127 A | 8/1994 | Maiocchi |
| 5,378,976 A | 1/1995 | Inaji et al. |
| 5,397,972 A | 3/1995 | Maiocchi |
| 5,428,276 A | 6/1995 | Carobolante et al. |
| 5,457,365 A | 10/1995 | Blagaila et al. |
| 5,541,488 A | 7/1996 | Bansal et al. |
| 5,631,999 A | 5/1997 | Dinsmore |
| 5,640,943 A * | 6/1997 | Tasaka et al. ............... 123/399 |
| 5,703,449 A | 12/1997 | Nagate et al. |
| 5,777,448 A | 7/1998 | Matsui |
| 5,780,983 A | 7/1998 | Shinkawa et al. |
| 5,821,717 A | 10/1998 | Hassan et al. |
| 5,841,252 A | 11/1998 | Dunfield |
| 5,844,388 A * | 12/1998 | Maiocchi .................... 318/439 |
| 5,869,946 A | 2/1999 | Carobolante |
| 5,870,363 A | 2/1999 | Sun et al. |
| 5,912,543 A * | 6/1999 | Mahr et al. ................. 318/705 |
| 5,929,577 A | 7/1999 | Neidorff et al. |
| 5,963,706 A | 10/1999 | Baik |
| 5,982,571 A | 11/1999 | Calfee et al. |
| 5,998,946 A | 12/1999 | Kim |
| 5,998,957 A * | 12/1999 | Tadmor et al. ............. 318/701 |
| 6,011,375 A * | 1/2000 | Korbel et al. ............... 315/599 |
| 6,037,735 A * | 3/2000 | Janosky et al. ............. 318/608 |
| 6,054,828 A | 4/2000 | Hill |
| 6,057,978 A | 5/2000 | Hayakawa |
| 6,078,158 A | 6/2000 | Heeren et al. |
| 6,100,656 A | 8/2000 | El-Sadi et al. |
| 6,130,868 A | 10/2000 | Yamamoto |
| 6,148,240 A * | 11/2000 | Wang et al. .................. 700/63 |
| 6,160,367 A | 12/2000 | Higashi et al. |
| 6,166,503 A * | 12/2000 | Korbel et al. ............... 318/434 |
| 6,285,521 B1 * | 9/2001 | Hussein .................. 360/73.03 |
| 6,323,617 B1 | 11/2001 | Maruyama et al. |
| 6,326,756 B1 | 12/2001 | Youn |
| 6,388,832 B1 * | 5/2002 | Dobbek et al. .......... 360/73.03 |
| 6,498,446 B1 * | 12/2002 | Menegoli et al. ........... 318/254 |
| 6,603,282 B2 * | 8/2003 | Kurashina ................... 318/685 |
| 2002/0079856 A1 * | 6/2002 | Hill et al. ................... 318/560 |
| 2002/0167287 A1 * | 11/2002 | Heydt et al. ................ 318/254 |
| 2003/0175018 A1 * | 9/2003 | Heydt et al. ................ 388/847 |

* cited by examiner

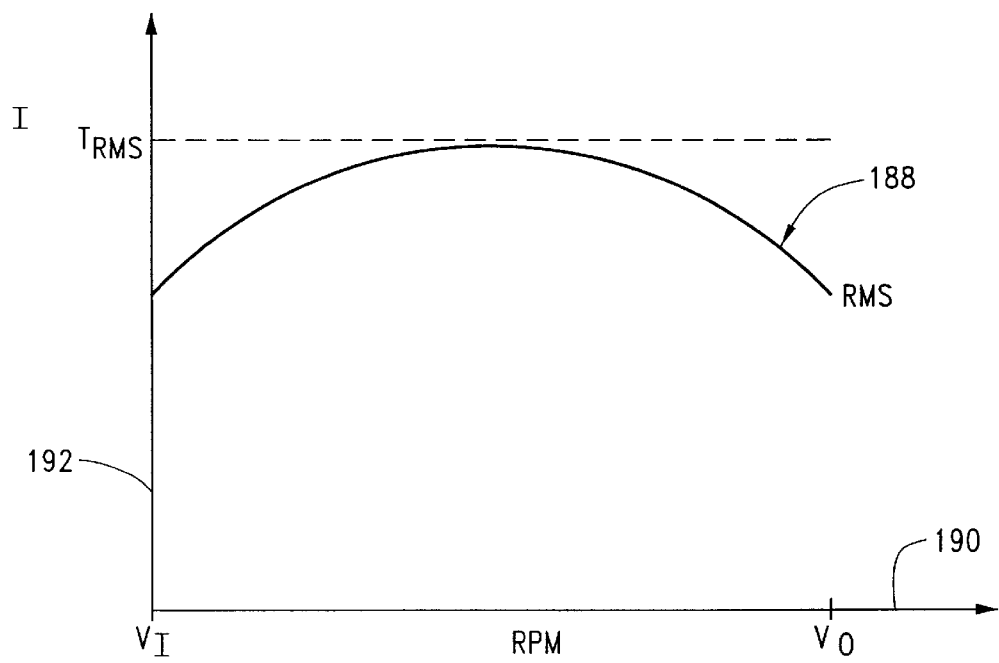
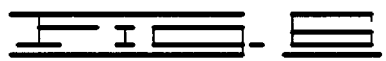
PRIOR ART
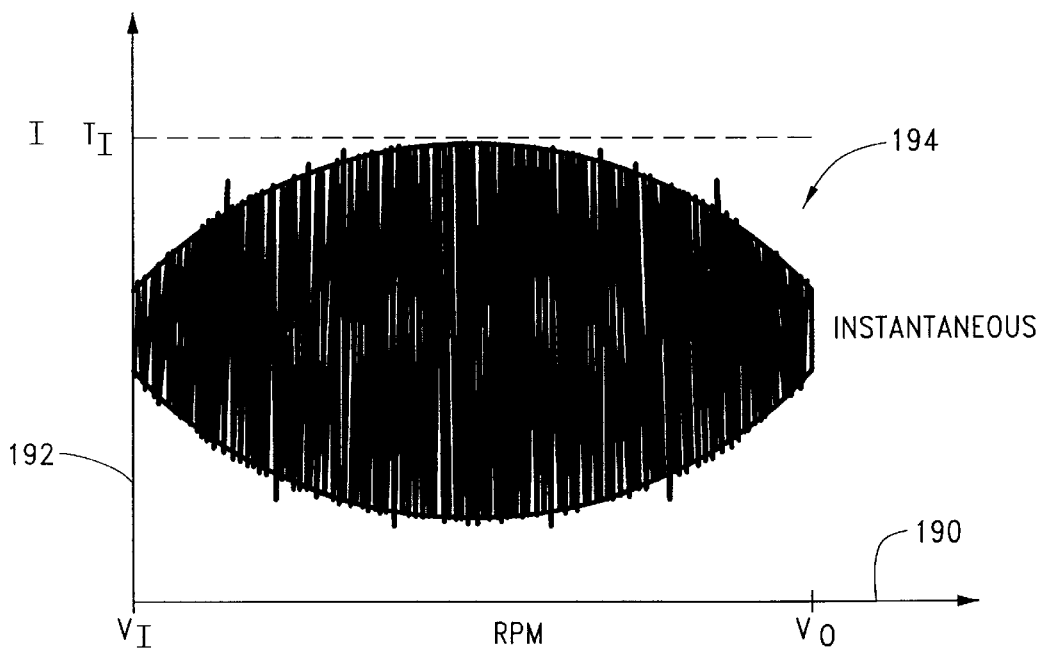
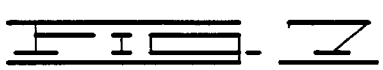
PRIOR ART

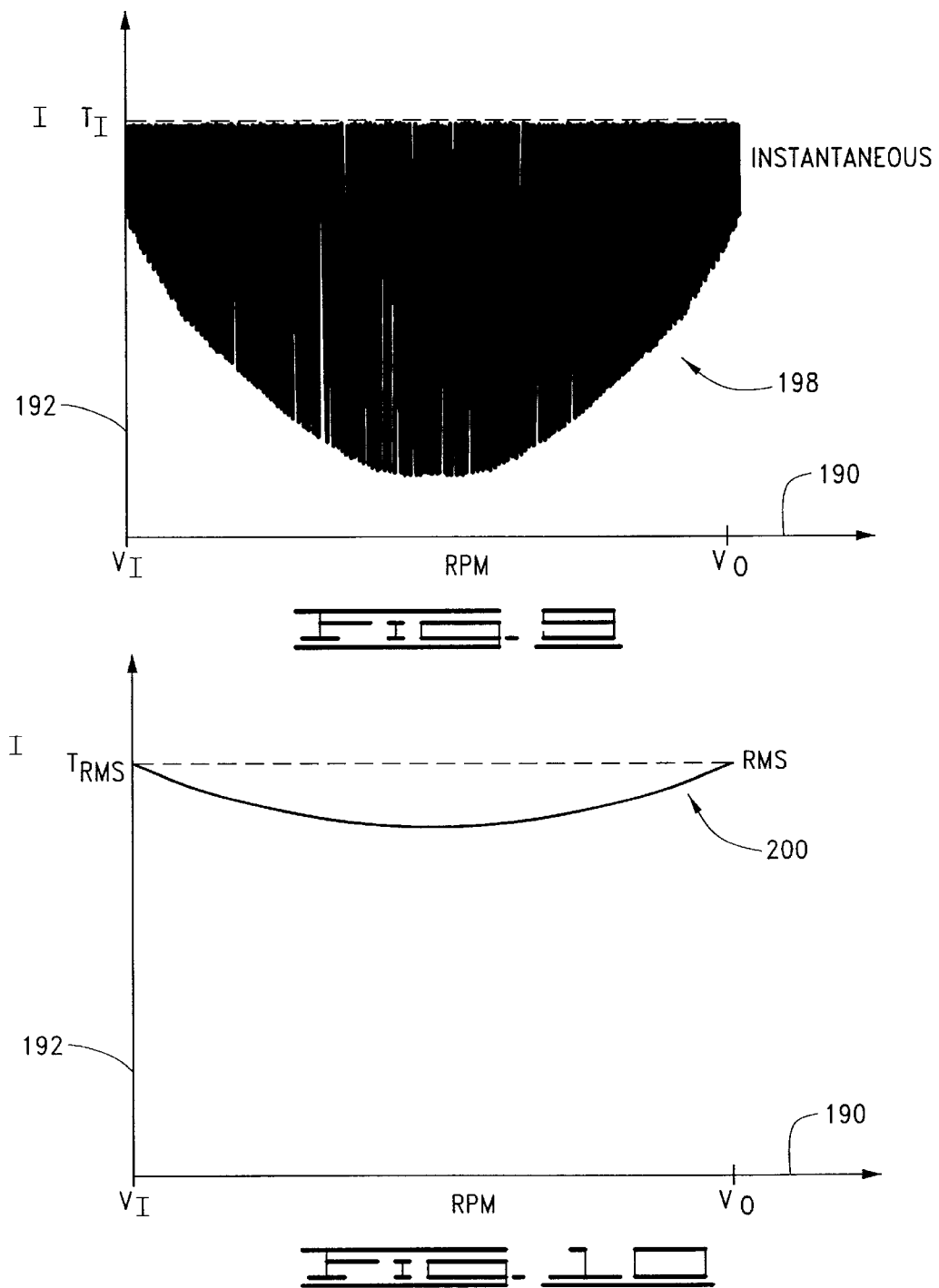

VELOCITY DEPENDENT REFERENCE PROFILE FOR SPINDLE MOTOR ACCELERATION CONTROL

This application is a continuation in part of copending parent U.S. patent application Ser. No. 09/995,206 filed Nov. 27, 2001 and claims priority to U.S. Provisional Application No. 60/253,216 filed Nov. 27, 2000 and No. 60/286,628 filed Apr. 26, 2001.

FIELD OF THE INVENTION

The claimed invention relates generally to the field of disc drive data storage devices and more particularly, but not by way of limitation, to a method and apparatus for accelerating a disc drive spindle motor from rest to a final operational velocity.

BACKGROUND

A disc drive is a data storage device used to store digital data. A typical disc drive includes a number of rotatable magnetic recording discs which are axially aligned and mounted to a spindle motor for rotation at a high constant velocity. A corresponding array of read/write heads access tracks defined on the respective disc surfaces to write data to and to read data from the discs.

Disc drive spindle motors are typically provided with a three-phase, direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields which interact with the magnetic fields of the magnets to apply torque to the spindle motor hub and induce rotation of the discs.

Due to the prevalence of numerous consumer devices that employ electrical motors, it might seem at first glance that accelerating a disc drive spindle motor from rest to a final operational velocity would be relatively straightforward; simply turn on the motor and let it accelerate to the final desired speed. As those skilled in the art will appreciate, however, accelerating a spindle motor from rest can be relatively difficult and involves a number of important considerations that must be adequately taken into account.

First, it is important to accurately determine the rotational state of a disc drive spindle motor prior to application of drive signals to the motor. Application of drive signals to a spindle motor while the motor is in an unknown state could lead to the inadvertent rotation of the motor in the wrong direction. Rotating the spindle motor in the wrong direction, even for a very short time, can lead to premature failure of a disc drive; heads and disc surfaces can be damaged, and lubricating fluid used in hydrodynamic spindle motor bearings can be pumped out of the bearings.

Early disc drive spindle motor designs used Hall effect or similar external sensors to provide an independent indication of motor positional orientation. However, present designs avoid such external sensors and instead use electronic commutation and back electromagnetic force (bemf) detection circuitry to provide closed-loop spindle motor control, such as discussed in U.S. Pat. No. 5,631,999 issued to Dinsmore. Such approach generally entails applying a predetermined sequence of commutation steps to the phase windings of the spindle motor over each electrical revolution (period) of the motor. A commutation step involves supplying the motor with current to one phase, sinking current from another phase, and holding a third phase at a high impedance in an unenergized state.

Detection circuitry measures the bemf generated on the unenergized phase, compares this voltage to the voltage at a center tap of the windings, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative speed of the motor.

Above an intermediate operational speed, the control circuitry will generally be able to reliably detect the bemf from rotation of the spindle motor, and will further be able to use the detected bemf to accelerate the motor to a final operational velocity. Below this intermediate speed, however, closed-loop motor speed control using detected bemf generally cannot be used since the spindle motor will not generate sufficient bemf at such lower speeds. Thus, other methodologies are required to detect the rotational position of the spindle motor when the motor is at rest.

Once the initial state of the motor is determined, a related consideration is getting the motor to properly and safely rotate up to the intermediate velocity so that the closed-loop motor control circuitry can take over and accelerate the motor up to the operational velocity. This can be accomplished, for example, by applying short duration pulses followed by position measurements to detect each successive commutation state transition. The velocity of the motor can be measured in relation to the elapsed time between successive commutation state transitions.

Further considerations are encountered once the motor reaches the intermediate velocity and transition to closed-loop acceleration takes place. Disc drives are typically installed as peripheral devices in larger data management systems (e.g. computer systems). The power consumption of a drive will typically be limited by the available power supply resources of the system.

It is common to invoke maximum current consumption specifications (both instantaneous peak current and root-mean-square (RMS) current) upon a drive design. Such specifications limit the rate at which current can be applied to a spindle motor during closed-loop acceleration. At the same time, customer requirements continue to demand shorter and shorter overall initialization times for drives to go from a deactivated (off) state to an operationally ready state. The time required to accelerate a spindle motor to the final operational velocity can comprise a significant portion of the total initialization time.

There is a need for improvements in the art to enable a spindle motor to accelerate from rest to a final operational velocity in a fast and reliable manner while maintaining power consumption requirements within specified levels. It is to such improvements that the present invention is directed.

SUMMARY OF THE INVENTION

In accordance with preferred embodiments, a disc drive includes a brushless direct current (dc) spindle motor which rotates a disc at an operational velocity during data transfer operations between the disc recording surface and a host device. The disc drive electrically commutates the spindle motor in response to detected back electromotive force (bemf) from the spindle motor during rotation.

The spindle motor is initially accelerated from rest to an intermediate velocity at which sufficient bemf is generated by the rotation of the spindle motor to enable commutation circuitry of the disc drive to time the application of drive pulses to the spindle motor. The spindle motor is then accelerated from the intermediate velocity to the operational velocity by applying a velocity dependent reference profile which establishes a sequence of reference levels to control the flow of current through the spindle motor during acceleration. The sequence of reference levels have different magnitudes at different velocities of the spindle motor between the intermediate velocity and the operational velocity.

Preferably, the sequence of reference levels comprise reference voltages which are compared to the voltage at a node of the spindle motor to generate a comparison signal which controls the flow of current through the spindle motor. In preferred embodiments, the velocity dependent reference profile comprises a pulse width modulated (PWM) signal having different duty cycles at the different velocities of the spindle motor during acceleration; in other preferred embodiments, the velocity dependent reference profile comprises a sequence of digital values having different magnitudes at the different velocities of the spindle motor during acceleration.

Preferably, a current limit specification threshold is provided indicative of a maximum acceptable level of current that can flow through the spindle motor as the spindle motor is accelerated from the intermediate velocity to the operational velocity. The velocity dependent reference profile is selected to maintain the magnitude of the current that flows through the spindle motor during acceleration below the specification threshold.

The velocity dependent reference profile is preferably selected by using an initial reference profile to accelerate the spindle motor from the intermediate velocity to the operational velocity. The current that flows through the spindle motor is measured during such acceleration, and the velocity dependent reference profile is selected in relation to the measured current. In this way, higher reference levels can be utilized at times during the acceleration period when margin is available to accelerate the motor faster without exceeding the specification threshold.

These and various other features and advantages which characterize preferred embodiments of the present invention will be apparent from a reading of the following detailed description and a review of the associated drawings.

BRIEF DESCRIPTION OF THE DRAWINGS

FIG. 7 illustrates instantaneous current employed by the spindle motor in response to the constant PWM drive signal of FIG. 5.

FIG. 8 is a graphical illustration of an RPM dependent response profile generated in accordance with preferred embodiments to accelerate the spindle motor.

FIG. 9 illustrates instantaneous current employed by the spindle motor in response to the profile of FIG. 8.

FIG. 10 correspondingly illustrates the RMS current applied to the spindle motor in response to the profile of FIG. 8.

DETAILED DESCRIPTION

Figure 1:
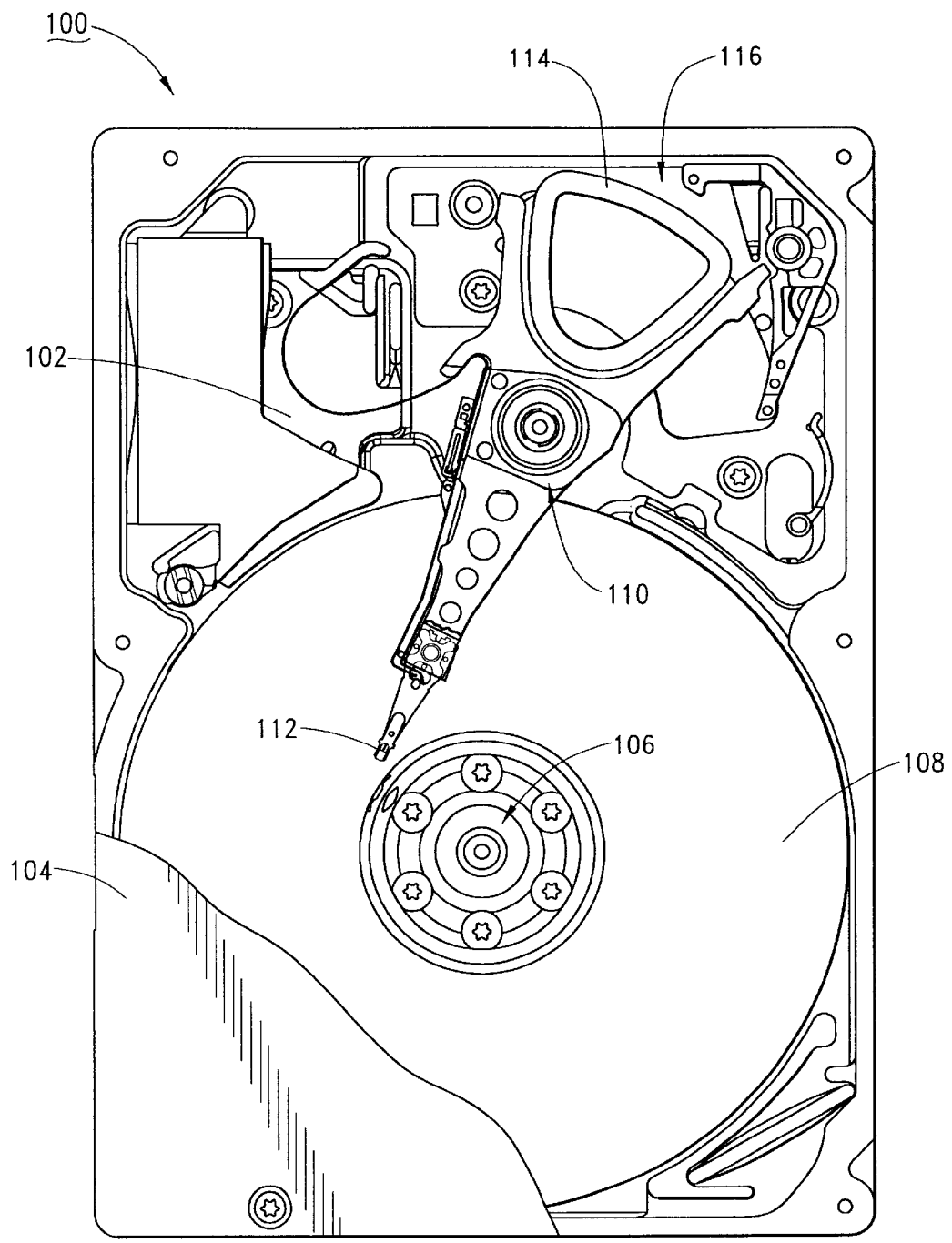
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
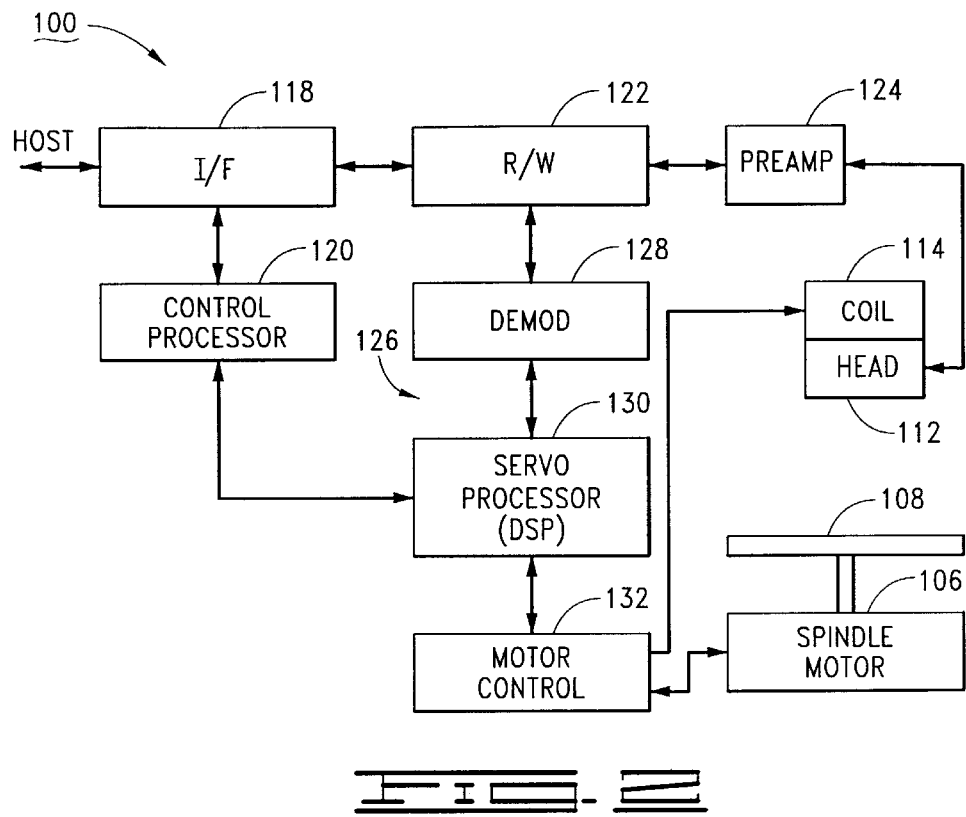
FIG. 2 provides a functional block diagram of the disc drive of FIG. 1.

FIG. 2 provides a functional block diagram of the disc drive 100. Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
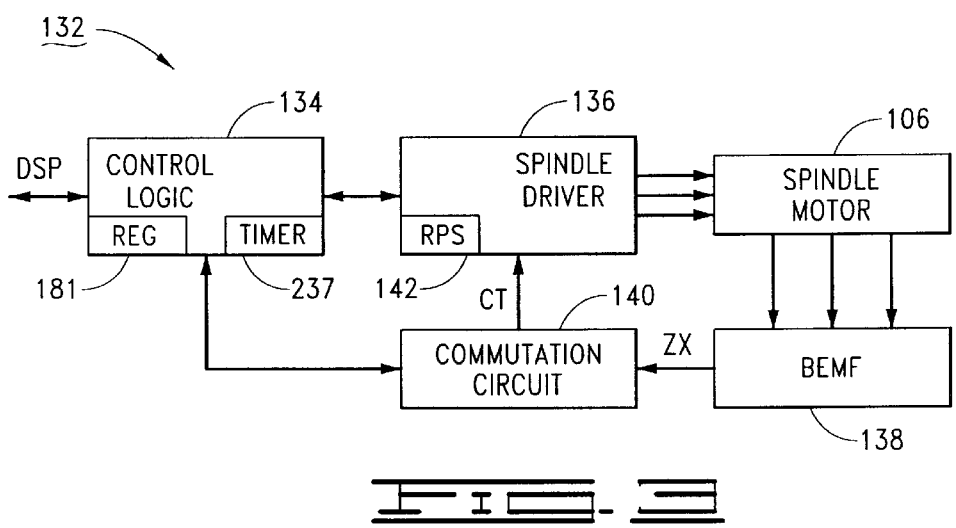
FIG. 3 provides a functional block diagram of relevant portions of the motor control circuitry of FIG. 2.

FIG. 3 provides a functional block diagram of relevant portions of the motor control circuitry 132 of FIG. 2. Control logic 134 receives commands from, and outputs state data to, the DSP 130. Spindle driver circuitry 136 applies drive currents to the phases of the spindle motor 106 over a number of sequential commutation steps to rotate the motor. During each commutation step, current is applied to one phase, sunk from another phase, and a third phase is held at a high impedance in an unenergized state.

Back electromagnetic force (bemf) detection circuitry 138 measures the bemf generated on the unenergized phase, compares this voltage to the voltage at a center tap, and outputs a zero crossing (ZX) signal when the bemf voltage changes polarity with respect to the voltage at the center tap.

A commutation circuit 140 uses the ZX signals to generate and output commutation timing (CT) signals to time the application of the next commutation step.

Figure 4:
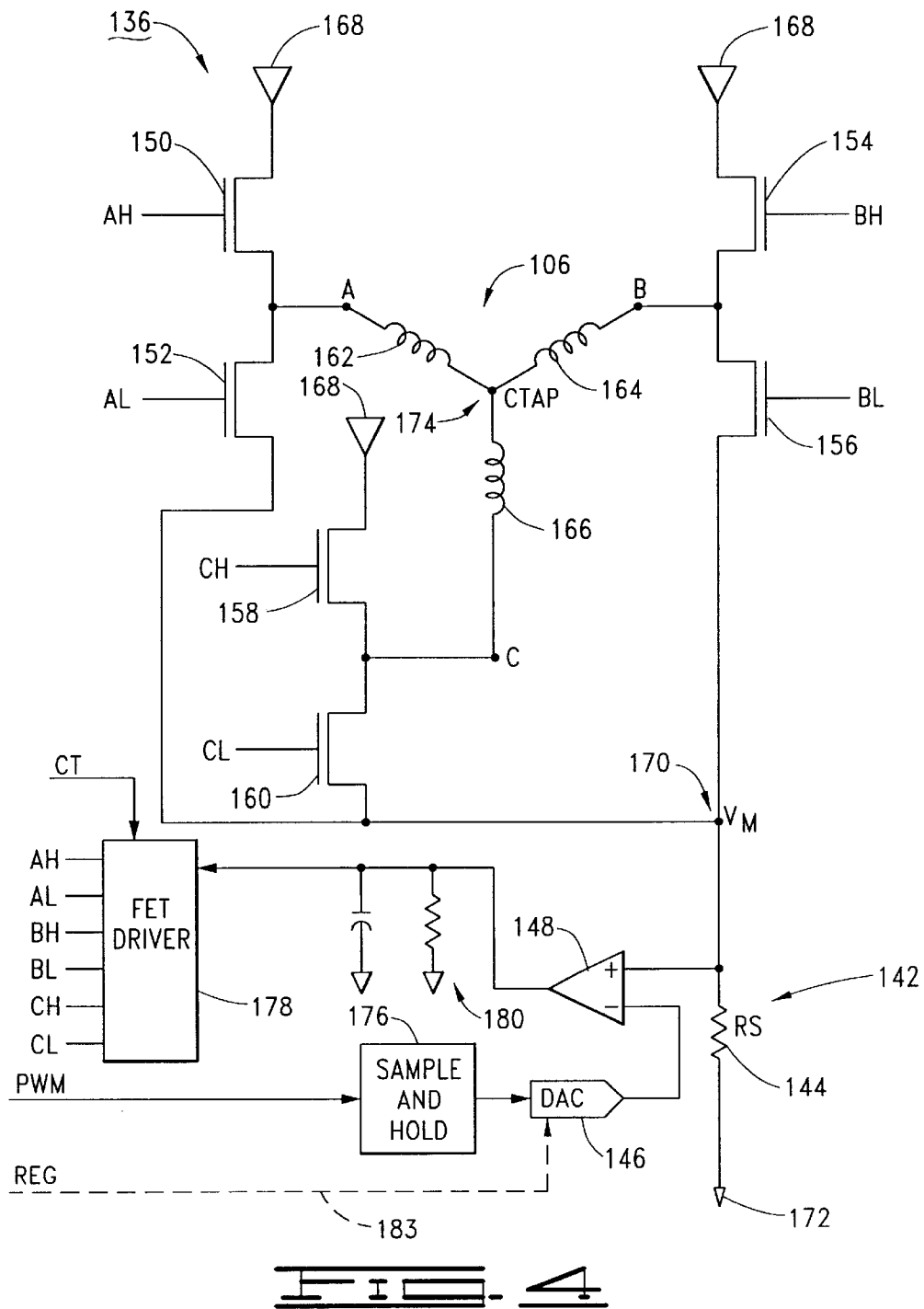
FIG. 4 provides a schematic representation of the spindle driver circuitry of FIG. 3.

The spindle driver circuitry 136 includes rotor position sense (RPS) circuitry 142 to detect electrical position of the spindle motor 106. With reference to FIG. 4, that the RPS circuitry 142 includes a sense resistor RS 144, a digital to analog converter (DAC) 146 and a comparator 148. FIG. 4 also shows the spindle driver circuitry 136 to include six field effect transistors (FETs) 150, 152, 154, 156, 158 and 160, with inputs denoted as AH (A high), AL (A low), BH, BL, CH and CL, respectively. Controlled, timed application of drive currents to the various FETs result in flow of current through A, B and C phase windings 162, 164 and 166 from a voltage source 168 to $V_M$ node 170, through the RS sense resistor 144 to reference node (ground) 172. Spindle motor commutation steps (states) are defined in Table 1:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

During commutation step 1, phase A (winding 162) is supplied with current, phase B (winding 164) outputs (sinks) current, and phase C (winding 166) is held at high impedance. This is accomplished by selectively turning on AH FET 150 and BL FET 156, and turning off AL FET 152, BH FET 154, CH FET 158 and CL FET 160. In this way, current flows from source 168, through AH FET 150, through A phase winding 162, through the center tap (CTAP node 174), through B phase winding 164, through BL FET 156 to $V_M$ node 170, and through RS sense resistor 144 to ground 172. The resulting current flow through the A and B phase windings 162, 164 induce electromagnetic fields which interact with a corresponding array of permanent magnets (not shown) mounted to the rotor (spindle motor hub), thus inducing a torque upon the spindle motor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the spindle motor is determined by the number of poles. With 3 phases, a 12 pole motor will have four electrical revolutions for each mechanical revolution of the spindle motor.

The frequency at which the spindle motor 106 is commutated, referred to as the commutation frequency FCOM, is determined as follows:

$$\text{FCOM} = (\text{phases})(\text{poles})(\text{RPM})/60 \qquad (1)$$

A three-phase, 12 pole spindle motor operated at 15,000 revolutions per minute would produce a commutation frequency of:

$$\text{FCOM} = (3)(12)(15,000)/60 = 9,000 \qquad (2)$$

or 9 kHz. The commutation circuit 140 will thus commutate the spindle driver 136 at nominally this frequency to maintain the spindle motor 106 at the desired operational velocity of 15,000 rpm. The foregoing relations can be used to determine the actual motor velocity (and therefore velocity error) in relation to the frequency at which the zero crossing ZX pulses are provided from the bemf detection circuitry 138.

As mentioned above, it is generally necessary to accelerate a spindle motor (such as 106) from rest to an intermediate velocity (such as around 1000 RPM) sufficient to enable bemf circuitry such as 138 to reliably detect zero crossings from the spindle motor. Once frequency lock is acquired, the motor control circuitry 132 operates in a closed loop mode to accelerate the motor from the intermediate velocity to the operational velocity (such as 15,000 RPM), and then maintain the motor at this operational velocity. This is carried out by providing a reference level that establishes the magnitude of current applied to the spindle motor 106 during each commutation step.

In a preferred embodiment, the reference level is established by a pulse width modulated (PWM) signal provided to a sample and hold block 176 shown in FIG. 4. The sample and hold block 176 outputs a voltage to the DAC 146 to establish a reference voltage for the comparator 148. The comparator 148 compares the voltage $V_M$ at node 170 with the reference voltage and provides a comparison signal to a FET driver circuit 178. High frequency components of the comparison signal are filtered by a filter network 180.

The FET driver 178 applies the appropriate inputs to the FETs 150, 152, 154, 156, 158 and 160 to commutate the spindle motor 106 as shown in Table 1 above. It will be noted that the FET driver 178 preferably maintains the high side FET on in a continuous state and modulates (turns on and off) the low side FET during each commutation step to maintain the current flowing through the motor at a magnitude dictated by the reference level (voltage) at the—input of the comparator 148. The reference level at the—input of the comparator 148 is established, in turn, by the duty cycle of the input PWM profile.

While the embodiment of FIG. 4 uses PWM control, other reference profile formats can readily be used. For example, in an alternative embodiment values are loaded to a register 181 (FIG. 3) and fed to the DAC 146 (via broken line connection path 183, FIG. 4) at appropriate times to establish the sequence of reference levels to control the flow of current through the spindle motor during acceleration.

Figure 5:
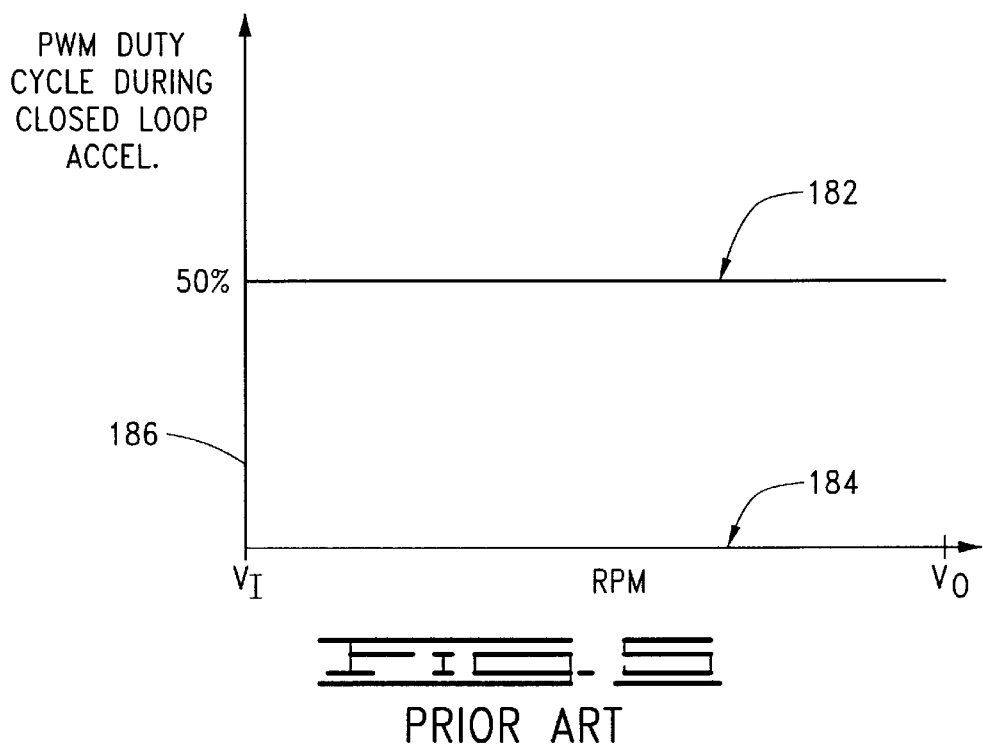
FIG. 5 is a graphical representation of a constant pulse width modulated (PWM) drive signal applied to the circuit of FIG. 4 to accelerate the spindle motor in accordance with the prior art.

It is common in the prior art to provide a constant reference level to the spindle driver 136 during closed loop acceleration of the spindle motor 106 from the intermediate velocity $V_I$ to the operational velocity $V_O$. An exemplary prior art PWM duty cycle during such acceleration is shown in FIG. 5. More particularly, FIG. 5 shows a PWM curve 182 plotted against an RPM x-axis 184 and a percent y-axis 186. The prior art PWM curve 182 has an exemplary duty cycle of 50 percent. This constant PWM is applied until the motor achieves the operational velocity, after which the PWM is modulated to maintain the motor at the operational velocity.

Significantly, application of a constant reference profile as shown by FIG. 5 does not typically result in the flow of constant current through the motor. Rather, it has been observed that inductive characteristics of a motor tend to change with rotational velocity of the motor; hence, the current flowing through a spindle motor during acceleration is often a function of motor RPM. The root-mean-squared (RMS) current and the instantaneous current flowing through the motor in response to a constant reference profile input such as shown in FIG. 5 will typically vary such as shown by FIGS. 6 and 7.

Figure 6:
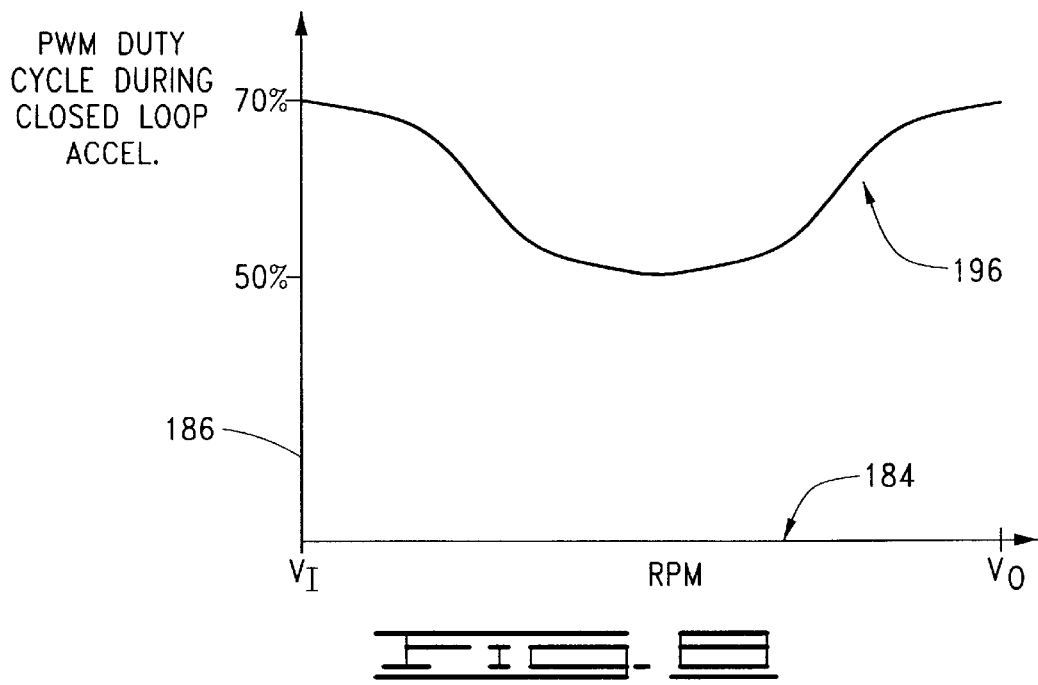
FIG. 6 is a graphical representation of a root-mean-square (RMS) current employed by the spindle motor in response to the constant PWM drive signal of FIG. 5.

FIG. 6 provides an RMS current curve 188 plotted against an RPM x-axis 190 and a current magnitude y-axis 192. FIG. 7 provides a corresponding instantaneous current curve 194 plotted against the same axes 190, 192. It is contemplated that the curves 188, 194 are generated in response to application of the prior art reference curve 182 of FIG. 5.

As mentioned above, power consumption requirements are typically imposed upon the disc drive 100, resulting in the specification of maximum RMS and/or maximum instantaneous (peak) current consumption by the spindle motor. These specification limits are graphically illustrated in FIGS. 6, 7 as an instantaneous current threshold $T_I$ and an RMS current threshold $T_{RMS}$. It will be noted that midportions of the curves 188, 194 are near the corresponding maximum current specifications, but other portions of the curves are not.

Accordingly, the present invention (as embodied herein and as claimed below) provides a velocity dependent reference profile that establishes a sequence of reference levels (voltages) having different magnitudes at different motor velocities between the intermediate and operative velocities. This enables larger amounts of current to flow through the spindle motor 106 at certain times during the acceleration process when additional margin is available with respect to the current threshold(s).

An exemplary velocity dependent reference profile is shown by PWM curve 196 in FIG. 8. The PWM curve 196 has a duty cycle of around 50 percent in midportions of the profile, and has increased duty cycle levels at beginning and ending portions of the profile. This results in instantaneous and RMS current values as shown by curves 198 and 200 in FIGS. 9 and 10, respectively. It will be noted that the instantaneous and RMS current values in FIGS. 9 and 10 are significantly closer to the specification limits over the entire acceleration profile from the intermediate velocity $V_I$ to the operational velocity $V_O$, and will thus tend to achieve faster acceleration of the spindle motor 106 as compared to the prior art.

Figures 11, 12:
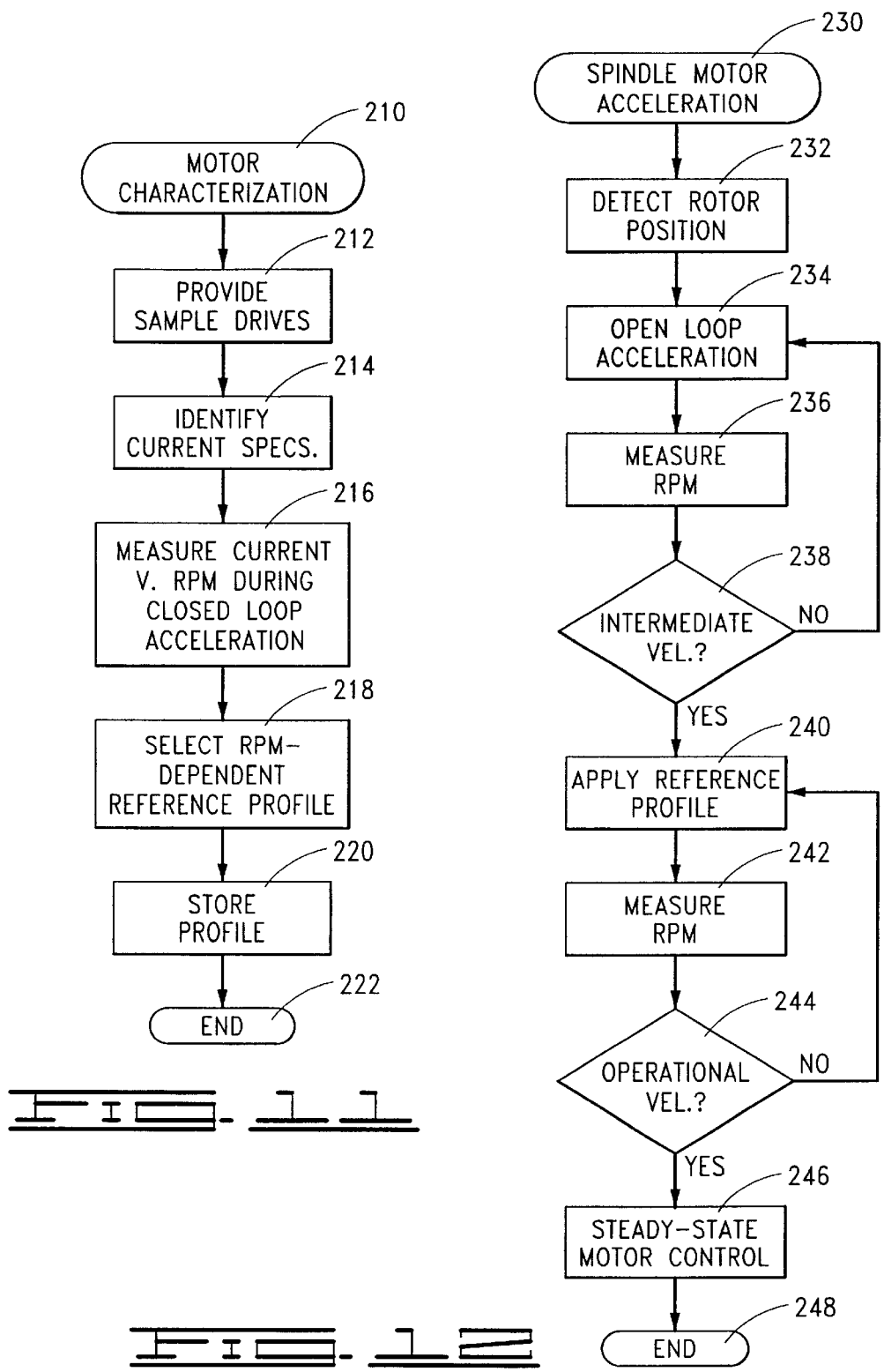
FIG. 11 is a flow chart for a MOTOR CHARACTERIZATION routine, generally illustrative of steps carried out in accordance with preferred embodiments to generate the profile of FIG. 8.
FIG. 12 is a flow chart for a SPINDLE MOTOR ACCELERATION routine illustrating a preferred manner in which the profile of FIG. 8 is used to accelerate the spindle motor.

FIG. 11 provides a flow chart for a MOTOR CHARACTERIZATION routine 210, illustrative of the manner in which the reference profile is preferably obtained. The routine of FIG. 11 is preferably carried out during disc drive design operations.

A population of sample drives having nominally the same characteristics are provided at step 212, with these drives having nominally the same characteristics as the disc drive 100 in FIG. 1. The relevant current specification or specifications (maximum RMS and/or instantaneous current) are identified at step 214. During step 216, an initial reference profile is selected and used to accelerate the spindle motors 106 of the various drives from rest to the operational velocity. Spindle motor current versus RPM measurements are obtained during this step using conventional measurement techniques. One preferred approach is the use of a digital oscilloscope to capture and display the current measurements.

From these measurements, a final RPM dependent reference profile is selected at step 218. The selection process can include some measure of trial and error based on the data obtained during step 216. As with other empirical analyses, the results are also preferably verified during this step. The final reference profile is stored at step 220 for future use by drives having this particular configuration. The process then ends at step 222.

The reference profile can be established and stored in a number of ways. One approach is to generate a look up table of profile values which are then referenced during operation; another approach is to use curve fitting techniques to arrive at a mathematical relation that can then be solved at each sample RPM value to provide the desired reference value. Yet another approach is to specify a limited number of table values in the profile and use interpolation techniques to calculate values between adjacent sample points. Regardless of form, the reference profile is stored in memory for future access by the servo processor 130.

FIG. 12 provides a flow chart for SPINDLE MOTOR ACCELERATION routine 230, generally illustrative of steps carried out in accordance with preferred embodiments to accelerate the spindle motor 106 of the disc drive 100 from rest to the operational velocity using the reference profile obtained during the routine of FIG. 11. The routine of FIG. 12 is preferably executed each time the drive is brought from a deactivated to an operationally ready state.

The routine commences at step 232 to initially detect the rotational position of the spindle motor. This is preferably carried out by applying a selected reference voltage to the comparator 148 (FIG. 4), sequentially applying pulses to each of the commutation states in turn, and measuring the elapsed time to obtain a crossover output from the comparator 148. The elapsed time for each commutation state will be a function of the inductance of the motor, which in turn is a function of the rotational position of the motor. Hence, the respective elapsed times can be used to detect the rotational position.

Once the initial position of the motor is known, the routine proceeds to step 234 wherein the motor is controlled in an open loop fashion to accelerate the spindle motor 106 from rest to the intermediate velocity. While a variety of methodologies can be used, one approach involves the sequential application of short duration drive pulses to the spindle motor 106 followed by measurements of rotor position to detect each successive change in commutation state. The elapsed time between successive commutation state changes will indicate motor RPM, which is measured as shown by step 236. A timer (counter) 237 in the control logic 134 (FIG. 3) is preferably used to measure the elapsed time between successive commutation state changes.

Decision step 238 inquires whether the intermediate velocity has been reached; thus, open loop acceleration continues through steps 234, 236 and 238 until such time that the motor reaches the intermediate velocity and a hand-off in control can be made to the bemf detection circuitry 138 and commutation circuitry 140.

Upon transition to closed loop control, the routine passes from decision step 238 to step 240 wherein the appropriate value from the reference profile is applied to the spindle driver circuit 136 (FIG. 4). RPM of the motor is measured at step 242 (as a function of the elapsed time between commutation state transitions or as a function of the commutation frequency FCOM). Decision step 244 inquires whether the operational velocity has been reached; if not, the most recent RPM measurement is used to identify the next appropriate reference profile value and the process is repeated.

Once the spindle motor 106 achieves the operational velocity, the flow of the routine passes from step 244 to step 246 wherein steady-state motor control is carried out to maintain the velocity of the spindle motor nominally at the operational velocity. The routine then ends at step 248.

Figure 13:
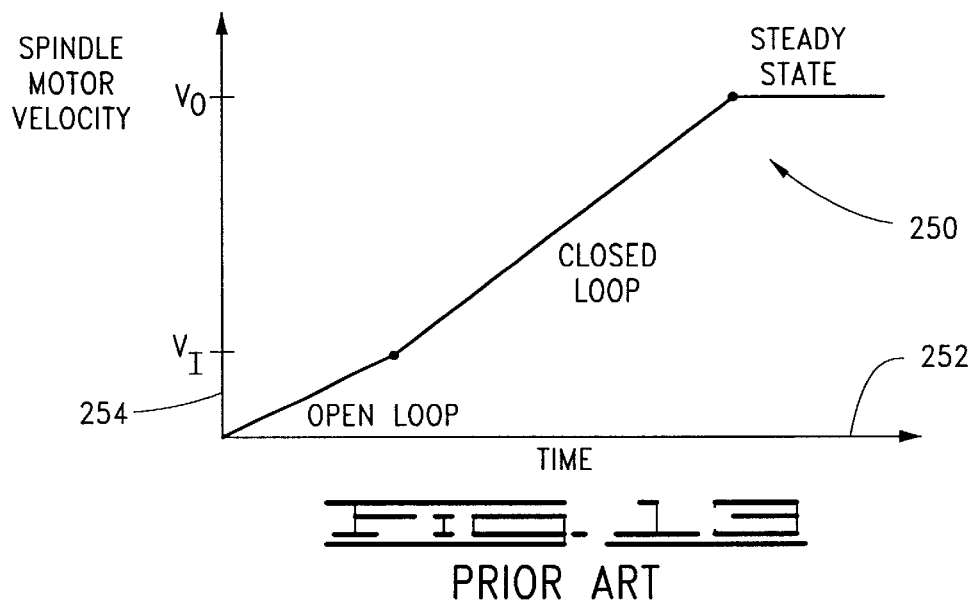
FIG. 13 is a graphical representation of a spindle motor acceleration curve generally illustrating the manner in which a spindle motor is accelerated from rest to operational velocity in accordance with the prior art.
Figure 14:
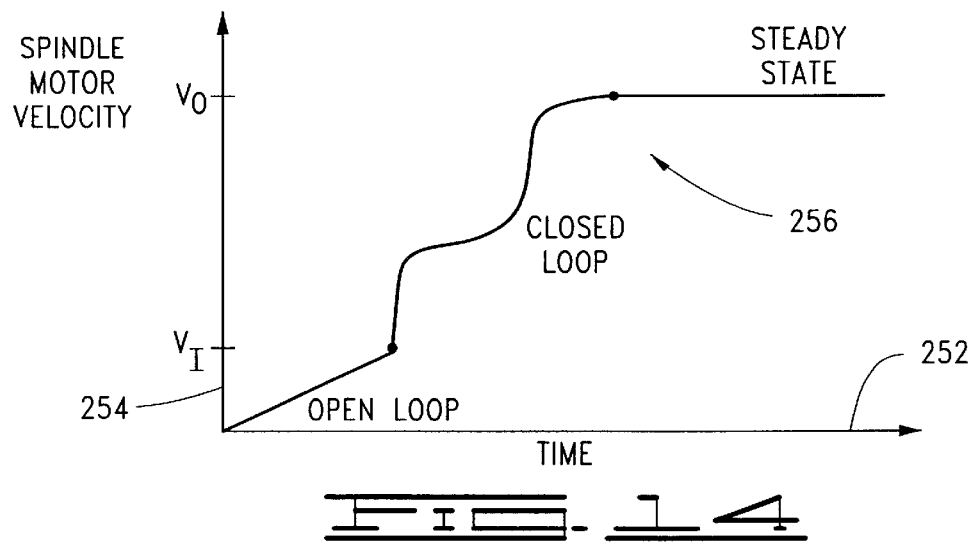
FIG. 14 is a graphical representation of a spindle motor acceleration curve generally illustrating the manner in which the spindle motor 106 of the disc drive 100 is accelerated from rest to operational velocity in accordance with the reference profile of FIG. 8.

Improvements in spindle motor acceleration achieved through the routine of FIG. 12 can be understood through a review of FIGS. 13 and 14. FIG. 13 provides a prior art spindle motor acceleration curve 250 plotted against an elapsed time x-axis 252 and a spindle motor velocity y-axis 254. It will be noted that the curve 250 represents initial open loop acceleration up to the intermediate velocity ($V_I$) in a manner such as set forth by steps 232, 234, 236 and 238 of FIG. 12, and then acceleration from the intermediate velocity to the operational velocity ($V_O$) using a fixed reference profile such as presented above in FIG. 5. While the closed loop acceleration portion of the prior art curve 250 shows nominally linear acceleration, it will be noted that the elapsed time comprises a significant portion of the overall time required to reach the operational velocity.

By contrast, FIG. 14 provides a spindle motor acceleration curve 256 plotted against the axes 252, 254 and representative of spindle motor acceleration in accordance with the routine of FIG. 12, including use of an adapted reference profile such as exemplified by FIG. 8. It will be noted that the closed loop acceleration of FIG. 14 enables the spindle motor to achieve the operational velocity in a shorter amount of time as compared to the prior art, while maintaining the current below the specified limits.

Accordingly, the present invention (as embodied herein and as claimed below) is generally directed to an apparatus and method for accelerating a disc drive spindle motor to an operational velocity. In accordance with preferred embodiments, a disc drive (such as 100) includes a brushless direct current (dc) spindle motor (such as 106) which rotates a disc (such as 108) at an operational velocity during data transfer operations between the disc recording surface and a host device. The disc drive electrically commutates the spindle motor in response to detected back electromotive force (bemf) from the spindle motor during rotation.

The method preferably comprises steps of initially accelerating the spindle motor from rest to an intermediate velocity at which sufficient bemf is generated by the rotation of the spindle motor to enable commutation circuitry of the disc drive to time the application of drive pulses to the spindle motor (such as by steps 232, 234, 236 and 238). Thereafter, the spindle motor is subsequently accelerated from the intermediate velocity to the operational velocity by applying a velocity dependent reference profile (such as 196) which establishes a sequence of reference levels to control the flow of current through the spindle motor during acceleration, the sequence of reference levels having different magnitudes at different velocities of the spindle motor between the intermediate velocity and the operational velocity (such as by steps 240, 242 and 244).

Preferably, the sequence of reference levels comprise reference voltages which are compared to the voltage at a node (such as 170) of the spindle motor to generate a comparison signal which controls the flow of current through the spindle motor. In preferred embodiments, the velocity dependent reference profile comprises a pulse width modulated (PWM) signal having different duty cycles at the different velocities of the spindle motor; in other preferred embodiments, the velocity dependent reference profile comprises a sequence of digital values having different magnitudes at the different velocities of the spindle motor.

The method further preferably comprises a prior step of providing a current limit specification threshold indicative of a maximum acceptable level of current that can flow through the spindle motor as the spindle motor is accelerated from the intermediate velocity to the operational velocity, so that the velocity dependent reference profile is selected to maintain the magnitude of the current that flows through the spindle motor during acceleration below the specification threshold.

The velocity dependent reference profile is preferably selected by using an initial reference profile (such as 182) to accelerate the spindle motor from the intermediate velocity to the operational velocity and measuring the current that flows through the spindle motor during such acceleration (such as by step 216). The velocity dependent reference profile is then selected in relation to the measured current (such as by step 218).

In other preferred embodiments, a disc drive (such as 100) includes a brushless direct current (dc) spindle motor (such as 106) configured to rotate at least one recording disc (such as 108), a read/write head (such as 112) configured to write data to the disc and read data from the disc as the spindle motor is rotated at an operational velocity, and a spindle motor driver circuit (such as 136) which applies drive currents to the spindle motor.

A back electromagnetic force (bemf) detection circuit (such as 138) detects bemf from rotation of the spindle motor above an intermediate velocity less than the operational velocity, and a commutation circuit (such as 140) provides commutation timing signals to the spindle motor driver circuit to electrically commutate the spindle motor in relation to the detected bemf over a range of commutation states of the spindle motor.

A control circuit (such as 130, 134) accelerates the spindle motor from the intermediate velocity to the operational velocity by applying a velocity dependent reference profile (such as 196) to the spindle motor driver circuit to establish a sequence of reference levels to control the flow of current through the spindle motor during acceleration to the operational velocity. The sequence of reference levels having different magnitudes at different velocities of the spindle motor between the intermediate velocity and the operational velocity.

Preferably, the sequence of reference levels comprise reference voltages which are compared to the voltage at a node (such as 170) of the spindle motor to generate a comparison signal which controls the flow of current through the spindle motor. In some preferred embodiments, the velocity dependent reference profile comprises a pulse width modulated (PWM) signal having different duty cycles at the different velocities of the spindle motor; in other preferred embodiments, the velocity dependent reference profile comprises a sequence of digital values having different magnitudes at the different velocities of the spindle motor.

Preferably, the velocity dependent reference profile is selected to maintain the magnitude of the current that flows through the spindle motor during acceleration below a current limit specification threshold indicative of a maximum acceptable level of current that can flow through the spindle motor as the spindle motor is accelerated from the intermediate velocity to the operational velocity.

For purposes of the appended claims the function of the recited "first means" will be understood as being carried out by the disclosed control logic block 134 and the servo processor 130 programmed in accordance with the routine 230 of FIG. 12 to accelerate the spindle motor 106 to the operational velocity. Prior art structures that utilize fixed reference profiles such as exemplified by prior art curve 182 in FIG. 5 are not included within the scope of the claim and are explicitly excluded from the definition of an equivalent.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the motor acceleration routine while maintaining the same functionality without departing from the spirit and scope of the invention.

In addition, although the embodiments described herein are generally directed to a motor acceleration routine for a disc drive, it will be appreciated by those skilled in the art that the routine can be used for other devices to accelerate a rotatable member from rest without departing from the spirit and scope of the claimed invention.

What is claimed is:

1. In a disc drive having a brushless direct current (dc) spindle motor which rotates a disc recording surface at an operational velocity during data transfer operations between the disc recording surface and a host device, the disc drive electrically commutating the spindle motor in response to detected back electromotive force (bemf) from the spindle motor during rotation, a method for accelerating the spindle motor from rest to the operational velocity comprising:

initially accelerating the spindle motor from rest to an intermediate velocity at which sufficient bemf is generated by the rotation of the spindle motor to enable commutation circuitry of the disc drive to time the application of drive pulses to the spindle motor; and subsequently accelerating the spindle motor from the intermediate velocity to the operational velocity by applying a velocity dependent reference profile which establishes a sequence of reference levels to control the flow of current through the spindle motor during acceleration, the sequence of reference levels having different magnitudes at different velocities of the spindle motor between the intermediate velocity and the operational velocity.

2. The method of claim 1, wherein the sequence of reference levels comprise reference voltages which are compared to a voltage at a node of the spindle motor to generate a comparison signal which controls the flow of current through the spindle motor.

3. The method of claim 1, wherein the velocity dependent reference profile comprises a pulse width modulated (PWM) signal having different duty cycles at the different velocities of the spindle motor between the intermediate velocity and the operational velocity so that the sequence of reference levels are established in relation to the different duty cycles of the PWM signal.

4. The method of claim 1, wherein the velocity dependent reference profile comprises a sequence of digital values having different magnitudes at the different velocities of the spindle motor between the intermediate velocity and the operational velocity so that the sequence of reference levels are established in relation to the different magnitudes of the digital values.

5. The method of claim 1, comprising a prior step of providing a current limit specification threshold indicative of a maximum acceptable level of current that can flow through the spindle motor as the spindle motor is accelerated from the intermediate velocity to the operational velocity, and wherein the velocity dependent reference profile is selected to maintain the magnitude of the current that flows through the spindle motor during acceleration below the specification threshold.

6. The method of claim 1, in combination with a method for selecting the velocity dependent reference profile comprising:

providing an initial reference profile;

using the initial reference profile to accelerate the spindle motor from the intermediate velocity to the operational velocity;

measuring current that flows through the spindle motor; and selecting the velocity dependent reference profile in relation to the measured current.

7. A disc drive, comprising:

a brushless direct current (dc) spindle motor configured to rotate at least one recording disc;

a read/write head configured to write data to the disc and read data from the disc as the spindle motor is rotated at an operational velocity;

a spindle motor driver circuit which applies drive currents to the spindle motor;

a back electromagnetic force (bemf) detection circuit which detects bemf from rotation of the spindle motor above an intermediate velocity less than the operational velocity;

a commutation circuit which provides commutation timing signals to the spindle motor driver circuit to electrically commutate the spindle motor in relation to the detected bemf over a range of commutation states of the spindle motor; and a control circuit which accelerates the spindle motor from the intermediate velocity to the operational velocity by applying a velocity dependent reference profile to the spindle motor driver circuit to establish a sequence of reference levels to control the flow of current through the spindle motor during acceleration from the intermediate velocity to the operational velocity, the sequence of reference levels having different magnitudes at different velocities of the spindle motor between the intermediate velocity and the operational velocity.

8. The disc drive of claim 7, wherein the sequence of reference levels comprise reference voltages which are compared to a voltage at a node of the spindle motor to generate a comparison signal which controls the flow of current through the spindle motor.

9. The disc drive of claim 7, wherein the velocity dependent reference profile comprises a pulse width modulated (PWM) signal having different duty cycles at the different velocities of the spindle motor between the intermediate velocity and the operational velocity so that the sequence of reference levels are established in relation to the different duty cycles of the PWM signal.

10. The disc drive of claim 7, wherein the velocity dependent reference profile comprises a sequence of digital values having different magnitudes at the different velocities of the spindle motor between the intermediate velocity and the operational velocity so that the sequence of reference levels are established in relation to the different magnitudes of the digital values.

11. The disc drive of claim 7, wherein the velocity dependent reference profile is selected to maintain the magnitude of the current that flows through the spindle motor during acceleration below a current limit specification threshold indicative of a maximum acceptable level of current that can flow through the spindle motor as the spindle motor is accelerated from the intermediate velocity to the operational velocity.

12. The disc drive of claim 7, wherein the control circuit comprises a control logic block coupled to the spindle motor driver circuit and a programmable servo processor which provides the velocity dependent reference profile to the control logic block for transmission to the spindle motor driver circuit.

13. The disc drive of claim 12, wherein the velocity dependent reference profile is characterized as a sequence of digital values, wherein the control logic block comprises a register in communication with the spindle driver circuit, and wherein the servo processor sequentially loads the digital values into the register during acceleration of the spindle motor from the intermediate velocity to the operational velocity.

14. The disc drive of claim 12, wherein the velocity dependent reference profile is characterized as a pulse width modulated (PWM) signal which is output by the control logic block to the spindle motor driver circuit.

15. A disc drive, comprising:
a brushless direct current (dc) spindle motor configured to rotate at least one recording disc;
a read/write head configured to write data to the disc and read data from the disc as the spindle motor is rotated at an operational velocity;
a spindle motor driver circuit which applies drive currents to the spindle motor;
a back electromagnetic force (bemf) detection circuit which detects bemf from rotation of the spindle motor above an intermediate velocity less than the operational velocity;
a commutation circuit which provides commutation timing signals to the spindle motor driver circuit to electrically commutate the spindle motor in relation to the detected bemf over a range of commutation states of the spindle motor; and
first means for accelerating the spindle motor from the intermediate velocity to the operational velocity by applying a velocity dependent reference profile to the spindle motor driver circuit to establish a sequence of reference levels to control the flow of current through the spindle motor during acceleration to the operational velocity, the sequence of reference levels having different magnitudes at different velocities of the spindle motor between the intermediate velocity and the operational velocity.

16. The disc drive of claim 15, wherein the first means comprises a control logic block coupled to the spindle motor driver circuit and a programmable servo processor which provides the velocity dependent reference profile to the control logic block for transmission to the spindle motor driver circuit.

17. The disc drive of claim 16, wherein the velocity dependent reference profile is characterized as a sequence of digital values, wherein the control logic block comprises a register in communication with the spindle driver circuit, and wherein the servo processor sequentially loads the digital values into the register during acceleration of the spindle motor from the intermediate velocity to the operational velocity.

18. The disc drive of claim 16, wherein the velocity dependent reference profile is characterized as a pulse width modulated (PWM) signal output by the control logic block to the spindle motor driver circuit.

19. The disc drive of claim 15, wherein the sequence of reference levels comprise reference voltages which are compared to a voltage at a node of the spindle motor to generate a comparison signal which controls the flow of current through the spindle motor.

20. The disc drive of claim 15, wherein the velocity dependent reference profile is selected to maintain the magnitude of the current that flows through the spindle motor during acceleration below a current limit specification threshold indicative of a maximum acceptable level of current as the spindle motor is accelerated from the intermediate velocity to the operational velocity.

21. The method of claim 1, wherein the different magnitudes of the sequence of reference levels comprise successively increasing magnitudes as the velocity of the spindle motor approaches the operational velocity.

22. The method of claim 3, wherein the different duty cycles of the PWM signal comprise relatively higher duty cycles, followed by relatively lower duty cycles, followed by relatively higher duty cycles as the spindle motor is accelerated from the intermediate velocity to the operational velocity.

23. The disc drive of claim 7, wherein the different magnitudes of the sequence of reference levels comprise successively increasing magnitudes as the velocity of the spindle motor approaches the operational velocity.

24. The disc drive of claim 9, wherein the different duty cycles of the PWM signal comprise relatively higher duty cycles, followed by relatively lower duty cycles, followed by relatively higher duty cycles as the spindle motor is accelerated from the intermediate velocity to the operational velocity.

25. The disc drive of claim 15, wherein the different magnitudes of the sequence of reference levels of the first means comprise successively increasing magnitudes as the velocity of the spindle motor approaches the operational velocity.

26. The disc drive of claim 18, wherein the PWM signal comprises a sequence of relatively higher duty cycles, followed by relatively lower duty cycles, followed by relatively higher duty cycles as the spindle motor is accelerated from the intermediate velocity to the operational velocity.

27. An apparatus comprising a spindle motor and a control circuit which establishes a sequence of reference levels to control currents flowing through the motor during acceleration of the motor from an intermediate velocity to an operational velocity, the sequence of reference levels providing said currents with successively increasing current magnitudes as the motor approaches the operational velocity.

28. The apparatus of claim 27, wherein the sequence of reference levels comprises a first set of reference levels that provides relatively greater current magnitudes, followed by a second set of reference levels that provides relatively lesser current magnitudes, followed by a third set of reference levels that provides relatively greater current magnitudes as the motor is accelerated from the intermediate velocity to the operational velocity.

29. The apparatus of claim 27, wherein the sequence of reference levels is derived from a corresponding sequence of digital values.

30. The apparatus of claim 27, wherein the sequence of reference levels is derived from a pulse width modulated (PWM) signal.

31. The apparatus of claim 27, wherein the control circuit further uses back electromotive force (bemf) detected from rotation of the motor to control the acceleration of the motor from the intermediate velocity to the operational velocity.

* * * * *